United States Patent [19]

Kaneda et al.

[11] Patent Number: 5,666,562
[45] Date of Patent: Sep. 9, 1997

[54] AUTOMATIC FOCUSING SYSTEM

[75] Inventors: Kitahiro Kaneda; Naoya Kaneda, both of Kanagawa-ken, Japan

[73] Assignee: Canon Kabushiki Kaisha, Tokyo, Japan

[21] Appl. No.: 562,782

[22] Filed: Nov. 27, 1995

Related U.S. Application Data

[63] Continuation of Ser. No. 269,639, Jul. 1, 1994, abandoned, which is a continuation of Ser. No. 147,900, Nov. 4, 1993, abandoned, which is a continuation of Ser. No. 47,880, Apr. 15, 1993, abandoned, which is a continuation of Ser. No. 967,966, Oct. 27, 1992, abandoned, which is a continuation of Ser. No. 580,195, Sep. 10, 1990, abandoned.

[30] Foreign Application Priority Data

Sep. 20, 1989 [JP] Japan .................................. 1-245596

[51] Int. Cl.$^6$ .................................................. G03B 17/00
[52] U.S. Cl. ............................ 396/49; 396/101; 396/125
[58] Field of Search ................................. 354/402, 404, 354/406, 407, 408; 358/227, 228; 250/201.2; 348/349, 354, 355, 356; 396/49, 101, 125

[56] References Cited

U.S. PATENT DOCUMENTS

| | | | |
|---|---|---|---|
| 3,896,304 | 7/1975 | Aoki et al. | 354/402 |
| 4,133,606 | 1/1979 | Hosoe et al. | 354/402 |
| 4,392,726 | 7/1983 | Kimura | 354/402 |
| 4,484,806 | 11/1984 | Onishi et al. | 354/404 |
| 4,804,831 | 2/1989 | Baba et al. | 354/402 |
| 4,922,346 | 5/1990 | Hidaka et al. | 358/227 |
| 4,965,443 | 10/1990 | Yamasaki et al. | 250/201.7 |
| 4,967,279 | 10/1990 | Murashima | 358/227 |
| 4,967,280 | 10/1990 | Takuma et al. | 358/227 |
| 4,969,045 | 11/1990 | Haruki et al. | 358/228 |
| 5,003,339 | 3/1991 | Kikuchi et al. | 354/402 |
| 5,005,086 | 4/1991 | Iwamoto et al. | 354/404 |
| 5,121,151 | 6/1992 | Kawabata et al. | 354/402 |

OTHER PUBLICATIONS

Patent Abstract of Japan, vol. 12, No. 385, Oct. 14, 1988, Summary of JP-A-63128878.
IEEE Transactions on Consumer Electronics, vol. CE-32, No. 3, Aug. 1986, pp. 312–318.

*Primary Examiner*—Russell E. Adams
*Attorney, Agent, or Firm*—Robin, Blecker, Daley & Driscoll

[57] ABSTRACT

An automatic focusing system comprises a focus detecting circuit arranged to detect the state of focus on the basis of a signal component which is extracted from an image signal and varies with the state of focus, a speed control circuit arranged to collate detected information on the signal component with preset conditions and to set a focus adjusting speed on the basis of a degree to which the detected information conforms with the conditions, and a circuit arranged to vary the setting of the conditions according to the level of the signal component of the image signal.

47 Claims, 12 Drawing Sheets

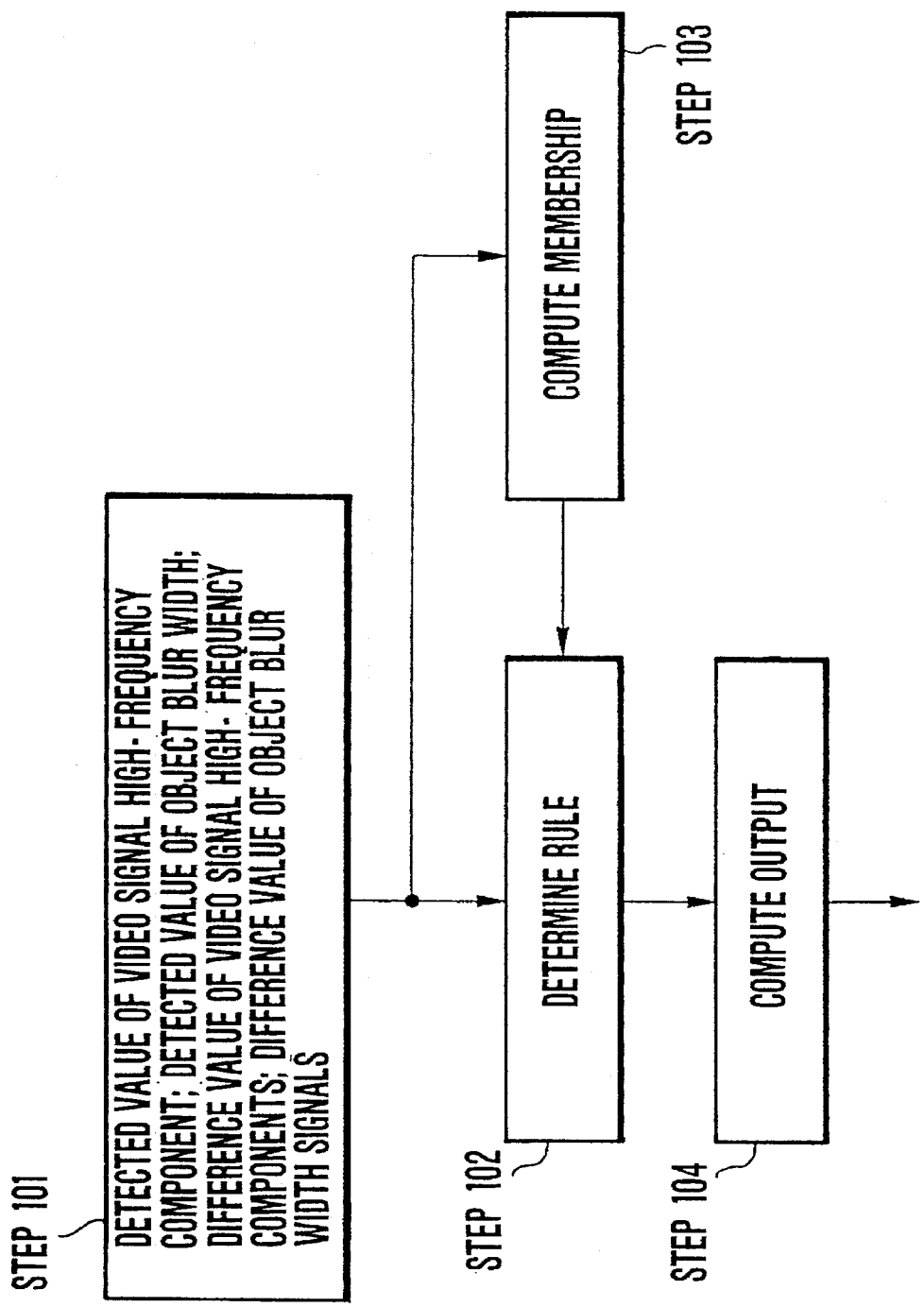

INPUT MEMBERSHIP FUNCTION

ES: EDGE WIDTH
(BLUR WIDTH)

dES: DIFFERENCE VALUE
OF EDGE WIDTHS

FV: HIGH-FREQUENCY
COMPONENT dFV: DIFFERENCE VALUE
OF HIGH-FREQUENCY
COMPONENTS

PFMS: DELAY TIME AT THE TIME
OF REVERSE ROTATION
OF FOCUS MOTOR

FMDIR: DRIVING DIRECTION
OF FOCUS MOTOR

OUTPUT MEMBERSHIP FUNCTION FOR DETERMINING SPEED

FMS: SPEED OF FOCUS MOTOR

NB: NEGATIVE BIG
NM: NEGATIVE MIDDLE
NS: NEGATIVE SMALL
ZO: ZERO
PS: POSITIVE SMALL
PM: POSITIVE MIDDLE
PB: POSITIVE BIG

FIG.6

RULES

1. IF (ES=B) AND (dES=ZO),
   THEN (FMS=ZO).

2. IF (FMDIR=P), (ES=B) AND (dES=PB),
   THEN (FMS=PS).

3. IF (PFMS=P), (ES=B) AND (dES=NB),
   THEN (FMS=NS).

4. IF (FMDIR=N), (ES=B) AND (dES=PB),
   THEN (FMS=PS).

5. IF (PFMS=N), (ES=B) AND (dES=NB),
   THEN (FMS=PS).

6. IF (FMDIR=P), (FV=B), (dFV=PB) AND (dES≠PB),
   THEN (FMS=PM).

7. IF (PFMS=P), (FV=B) AND (dFV=NB),
   THEN (FMS=NM).

8. IF (FMDIR=N), (FV=B), (dFV=PB) AND (dES≠PB),
   THEN (FMS=NM).

9. IF (PFMS=N) AND (FV=B),
   THEN (FMS=PM).

10. IF (FMDIR=P), (FV=S), (dFV=PS) AND (dES≠PB),
    THEN (FMS=PB).

11. IF (PFMS=P), (FV=S) AND (dFV=NS),
    THEN (FMS=NB).

12. IF (FMDIR=N), (FV=S), (dFV=PS) AND (dES≠PB),
    THEN (FMS=NB).

13. IF (PFMS=N), (FV=S) AND (dFV=NS),
    THEN (FMS=PB).

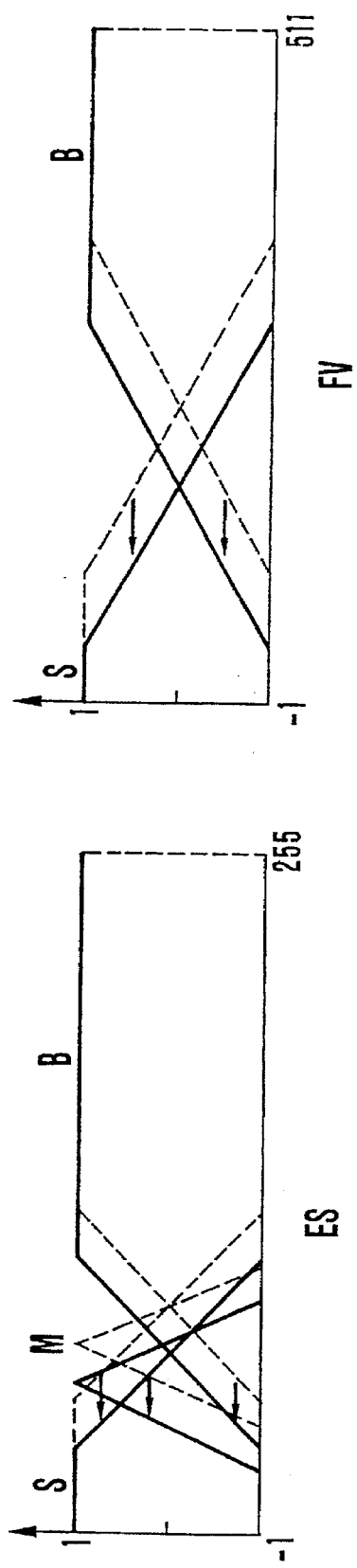
FIG. 8(a) LOW-CONTRAST OBJECT
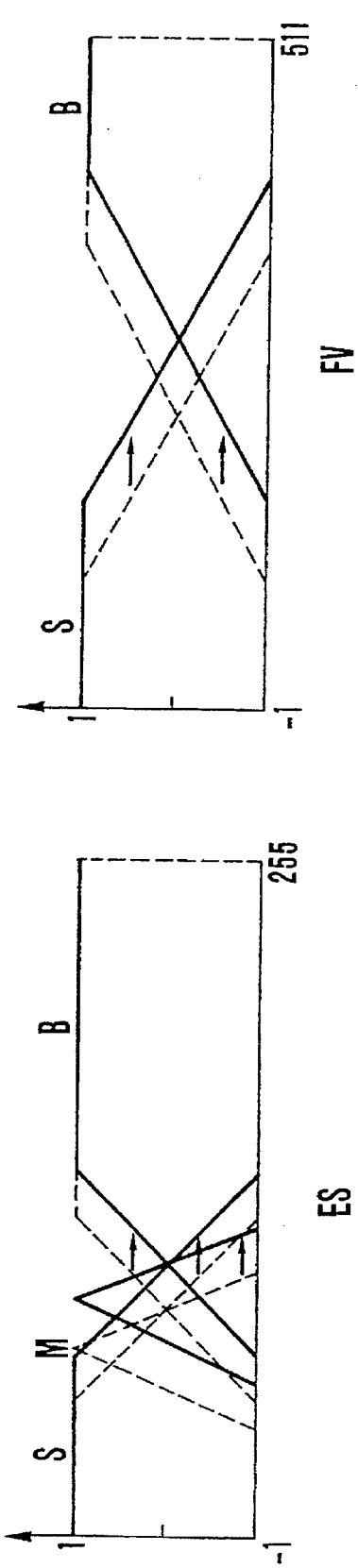
FIG. 8(b) HIGH-LUMINANCE OBJECT

LOW-CONTRAST OBJECT

HIGH-LUMINANCE OBJECT

AUTOMATIC FOCUSING SYSTEM

This is a continuation application under 37 CFR 1.62 of prior application Ser. No. 08/269,639, filed on Jul. 1, 1994, now abandoned, which is a continuation of Ser. No. 08/147,900 filed Nov. 4, 1993 (abandoned) which is a continuation of Ser. No. 08/047,880 filed Apr. 15, 1993 (abandoned) which is a continuation of Ser. No. 967,966 filed Oct. 27, 1992 (abandoned) which is a continuation of Ser. No. 580,195 filed Sep. 10, 1990 (abandoned).

BACKGROUND OF THE INVENTION

1. Field of the Invention

This invention relates to an automatic focusing system advantageously adapted for a video apparatus such as a video camera, electronic still camera or the like.

2. Description of the Related Art

Various methods have hitherto been developed for the automatic focusing systems of cameras. In the case of an apparatus of the kind having image sensing means for obtaining a video signal by photo-electrically converting an object image, such as a video camera or an electronic still camera, it is known that the automatic focusing system is arranged to detect the sharpness or definition of the object image from the video signal and to control the position of a focusing lens in such a way as to obtain a maximum degree of image sharpness.

Meanwhile, a method for controlling a speed at which the focusing lens is to be driven by the focusing system of the above-stated kind has been disclosed, for example, in U.S. patent application Ser. No. 500,297 filed on Mar. 27, 1990. In accordance with this method, the blur width of the edge of an object image is detected and the focusing lens driving speed is adjusted according to the detected value of the blur width.

In the case of the method for detecting focus by extracting from the video signal a signal component which varies with the state of focus, it is sometimes difficult to accurately make focus adjustment in a natural manner as the signal component fluctuates according to the object and the environment thereof.

The control operation of the focusing system therefore includes some ambiguities in itself. It may appear that a fuzzy inference which has recently begun to be used for control in various fields is effectively applicable to focusing adjustment control. It is conceivable to apply the fuzzy inference to the focusing system of this kind, for example, in the following manner: the high-frequency component of the video signal and the detected value of the blur width of the object image are processed by the fuzzy inference. Then, the automatic focusing action can be accomplished by determining the speed and direction of a focusing lens driving action on the basis of the result of the fuzzy inference process.

In using the fuzzy inference for focusing lens driving control, membership functions are defined for the detected value of the blur width of the object image and the value of the high-frequency component of the video signal. In actuality, however, both the detected value of blur width and that of the high-frequency component greatly fluctuate with the conditions of the object. The degree of such fluctuations might exceed too much the limit of the intrinsic ambiguities of the membership functions. In such a case, the focusing motor driving control cannot be adequately accomplished by the fuzzy inference.

More specifically, in the case of the automatic focusing system of this kind, the detected value of blur width of the object image and the signal value of the high-frequency component become lower than usual at An in-focus point in the event of an object of low contrast. In that event, if the membership functions are set in a normal manner, they would be judged to be lower than the actual values. Then, the driving speed of a focusing motor would be set at a high speed even in the neighbor hood of an in-focus point and the focusing lens cannot be brought to a stop accurately at the in-focus point. Further, in the event of a high-luminance object, the conditions of the membership functions might be judged to be higher than the actual values. The driving speed of the focusing motor is then likely to be set at a speed too low. In that case, either the focusing motor comes to a stop before reaching an in-focus point or an excessively long period of time becomes necessary for focusing.

SUMMARY OF THE INVENTION

This invention is directed to the solution of the problems mentioned in the foregoing. It is, therefore, a first object of the invention to provide an automatic focusing system which is capable of accurately performing automatic focus adjustment in a natural manner irrespectively of the conditions of a picture-taking object.

It is a second object of the invention to provide an automatic focusing system which is of the kind continuously keeping focus on an object having many ambiguities and is arranged to facilitate the use of a fuzzy inference and to be capable of performing optimum control.

It is a third object of the invention to provide an automatic focusing device which is capable of accurately computing output information for focus adjustment even in the event of changes in the conditions of a picture-taking object and is arranged to perform no faulty action.

It is a fourth object of the invention to provide an automatic focusing system which is capable of always adequately controlling the speed of focus adjustment.

To attain the above-stated objects, an automatic focusing system which is arranged according to this invention as a preferred embodiment thereof comprises: focus detecting means for detecting the state of focus on the basis of a signal component which is extracted from an image signal and varies with the state of focus; speed control means arranged to collate detected information on the signal component with preset conditions and to set a focusing speed on the basis of a degree to which the detected information conforms with the conditions; and means for varying the conditions according to the level of a predetermined signal component of the image signal.

It is a fifth object of the invention to provide an automatic focusing system which is capable of accurately, quickly and comfortably making focus adjustment without any faulty action by optimizing the conditions of setting the driving speed of a focus motor according to the conditions of the picture-taking object and its environment.

It is a sixth object of the invention to provide an automatic focusing system of the kind controlling focus adjustment by collating a plurality Of data of input information with a plurality of rules preset for the input information data to obtain a computed evaluation value showing a degree to which these data conform with the rules and to control focus adjustment on the basis of the evaluation value, the system being arranged to optimize the focus adjustment by correcting the computed evaluation value according to any change in the object.

It is a seventh object of the invention to provide an automatic focusing system which is capable of comfortably performing a focusing action in the following manner: a focus motor is controlled by a fuzzy inference. In controlling the focus motor by the fuzzy inference, the input membership function of the fuzzy inference is varied according to the degree of contrast of a picture-taking object, so that the focus motor control can be accomplished in an optimum manner irrespectively of the conditions of the object and the advantageous feature of fuzzy control can be fully interference attained.

It is an eighth object of the invention to provide an automatic focusing system, wherein a fuzzy inference is used in performing control including some ambiguity that affects an in-focus state determining process accordingly as changes occur in the condition of a picture-taking object; conditions set for in-focus state determination are arranged to be variable in a case where the object condition changes to such a degree that exceeds the range of the conditions set for the determination, so that focus control information can be appositely inferred; and this enables the focus control system of the kind using the fuzzy inference which is highly suited for ambiguity involving control to accomplish the control with such naturalness that is an intrinsic advantage of the fuzzy inference.

To attain each of the above-stated objects, an automatic focusing system according to this invention comprises: detecting means for detecting from an image signal a high-frequency signal component which varies with the state of focus and a signal component related to the edge of an object image; speed control means arranged to set a focus adjusting speed on the basis of degrees to which information data representing the high-frequency signal component and information data representing the edge signal component conform with a plurality of conditions preset for a plurality of these data; and means for varying the conditions on the basis of information on the luminance level of the image signal.

The above and other objects and features of the invention will become apparent from the following detailed description of embodiments thereof taken in connection with the accompanying drawings.

BRIEF DESCRIPTION OF THE DRAWINGS

FIG. 3 is a flow chart showing the control by a fuzzy inference over the speed of a focus motor.

FIG. 6 shows the rules of the fuzzy inference.

FIGS. 8(a) and 8(b) show the control over membership function setting conditions performed according to mode determination.

DETAILED DESCRIPTION OF THE PREFERRED EMBODIMENTS

Figure 1:
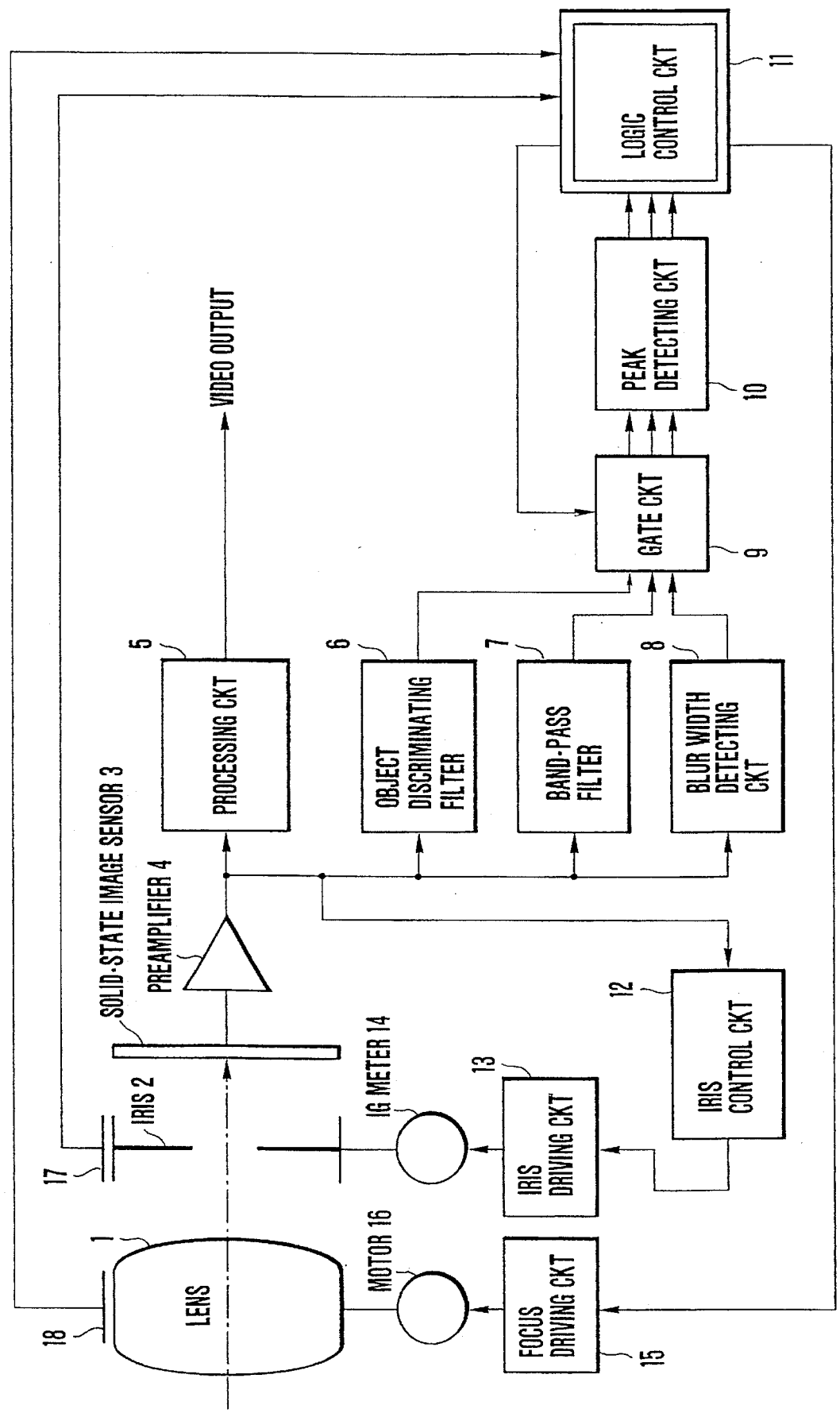
FIG. 1 is a block diagram showing the arrangement of an automatic focusing system arranged as an embodiment of this invention.
Figure 2A:
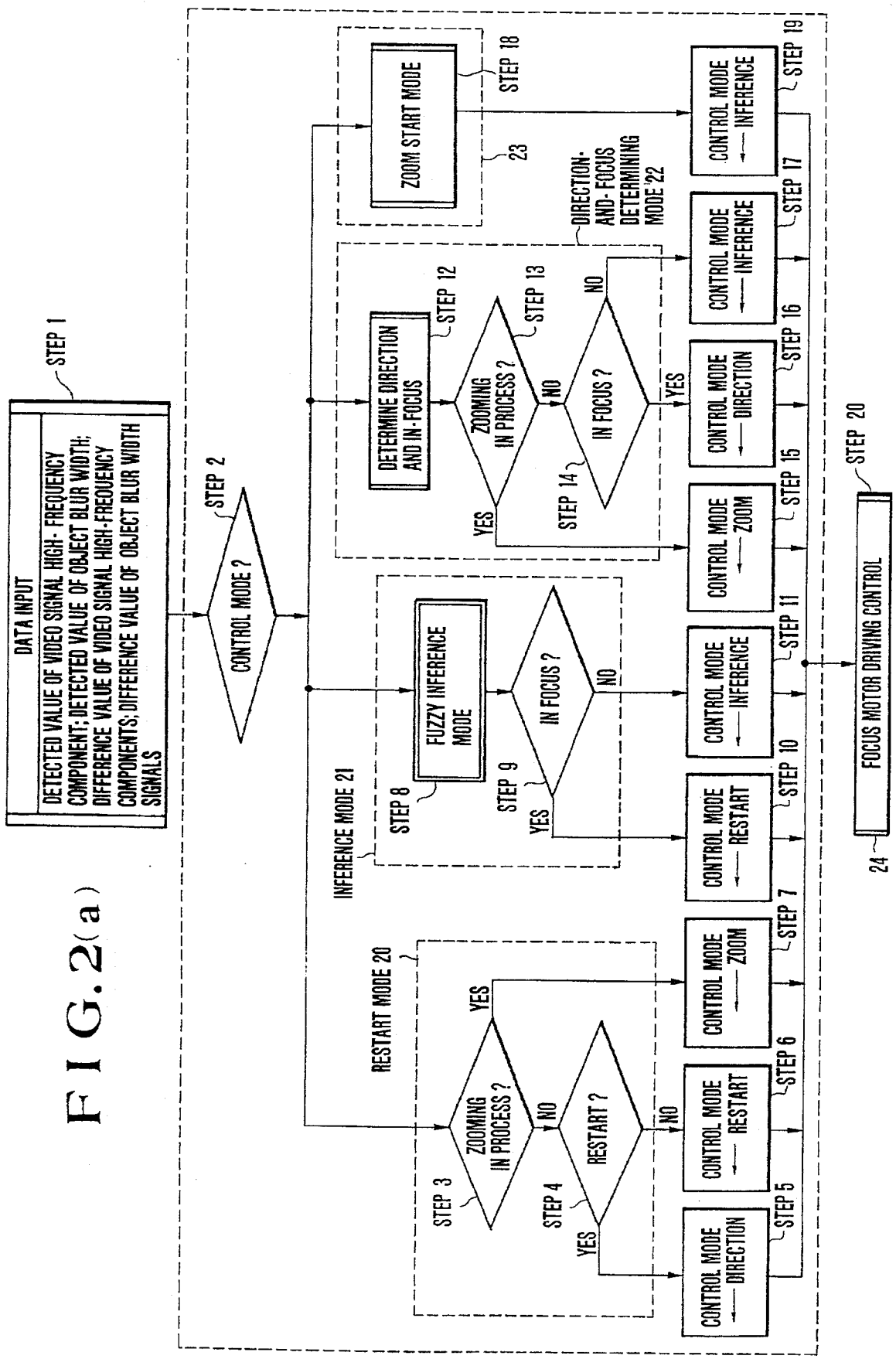
FIGS. 2(a) and 2(b) are flow charts showing the control operation of the invented automatic focusing system.
Figure 2B:
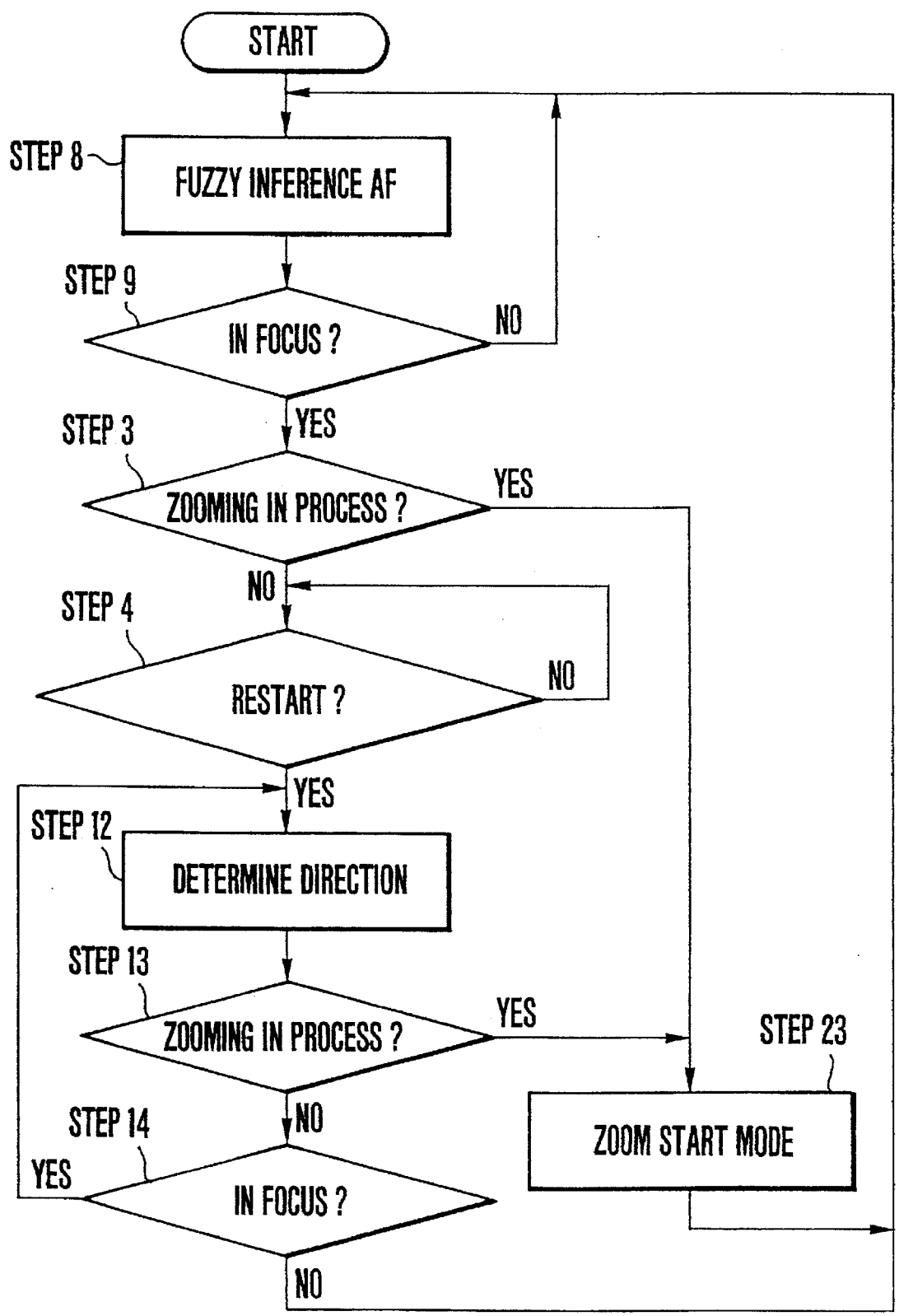

The details of the automatic focusing system of this invention are described below through some embodiments thereof with reference to the accompanying drawings:

FIG. 1 shows in a block diagram an automatic focusing system which is arranged according to this invention as an embodiment thereof. FIGS. 2(a) and 2(b) show in flow charts the control operation of a logic control circuit which is arranged to control the whole system of FIG. 1.

Referring to FIG. 1, a lens group 1 which is provided for focusing (hereinafter referred to as a focusing lens) is arranged to be driven and shifted by a focus motor 16 in the direction of an optical axis. An iris 2 which is provided for controlling the quantity of incident light is arranged to be operated by means of an IG meter 14 through an iris driving circuit 13, controlled by an iris control circuit 12.

The incident light comes through the focusing lens 1 and the iris 2 and forms an image on the image sensing plane of a solid-state image sensor 3 which is a CCD or the like. The image thus formed is converted into an electrical signal. The electrical signal (an image or video signal) is amplified by a preamplifier 4 up to a given level. The amplified signal is supplied to a processing circuit 5. The processing circuit 5 performs a signal processing action on the image signal to convert it into a standard TV signal form. The signal thus processed is output from a video output terminal to an electronic viewfinder (hereinafter referred to as EVF) or the like.

An object discriminating filter 6 is a total band filter which is arranged to permit determination of the degree of contrast of the object from the video signal output from the preamplifier 4. As will be described later herein, the filter 6 produces information required in controlling a process of setting membership functions for determining an in-focus state and a focus motor driving speed. A band-pass filter 7 is arranged to extract from the video signal a high-frequency component to be used for detecting the state of focus.

The output of the preamplifier 4 is supplied also to a blur width detecting circuit 8. The blur width detecting circuit 8 is arranged to measure the blur width of an object image formed on the image sensing plane and to produce information on the width of the edge part of the object image. The width of the edge part decreases accordingly as the state of focus comes closer to an in-focus point. Therefore, the focus can be adjusted by driving and shifting the position of the focusing lens 1 in such a way as to minimize the width of the edge part.

The details of this focus adjusting action are well known and have been disclosed, for example, in Japanese Laid-Open Patent Applications No. SHO 62-103616 and No. SHO 63-128878, U.S. Pat. No. 4,804,831 and U.S. patent application Ser. No. 121,624 filed on Nov. 17, 1987. The output of the total band filter, the high-frequency component signal and the blur width signal are supplied to a gate circuit 9 which is arranged to set within the image sensing plane a focus detecting area (or a distance measuring frame) and a peak detecting circuit 10. These circuits 9 and 10 thus produce the peak values and integrated values of these signals obtained from within the distance measuring frame. These outputs of the peak detecting circuit 10 are supplied to a logic control circuit 11, which performs overall control over the whole system and is, for example, composed of a microcomputer. In addition to these input data, the logic control circuit 11 receives as input data the detected values obtained by a focusing lens encoder 18 and an iris encoder 17.

In accordance with the time-serial changes of these data, the logic control circuit 11 determines the speed, direction, stopping and restarting of a driving action on the focusing lens 1. Then, the circuit 11 supplies a focus driving circuit 15 with a control signal According to the result of determination. In accordance with the control signal, the focus driving circuit 15 drives the focus motor 16 to shift the focusing lens 1.

Next, with reference to FIGS. 2(a) and 2(b), the flow of the control operation of the logic control circuit 11 is described as follows: in FIG. 2(a), a step 1 is a data computing routine. At the step 1, the analog outputs of the object distinguishing filter 6, the band-pass filter 7 and the blur width detecting circuit 8 are A/D (analog-to-digital) converted for every field into data required for focusing. More specifically, the detected value of the high-frequency component of the video signal, that of the blur width of the object image and their difference values are computed respectively.

A step 2 is a routine whereby the operating mode of the flow of focus control is determined and is shifted to an applicable predetermined routine. A block 20 is a routine called a restart mode and consists of steps 3 and 4. At the steps 3 and 4: The logic control circuit 11 decides, after an in-focus state is attained, whether the focus motor 16 is to be restarted according to changes in the above-stated input signals. After that, the mode is shifted either to a direction and-focus determining mode or a zoom start mode as will be described later. A block 21 consists of steps 8 and 9 and is a routine whereby the actual speed of the focus motor 16 is controlled and the state of focus is determined with a fuzzy inference. This routine forms the core of the flow of focus control. This routine is called an inference mode, the details of which will be described later herein.

A block 22 which consists of steps 12, 13 and 14 is the direction-and-focus determining mode. The flow of control comes to this mode when the focus motor 16 is determined to be restarted at the above-stated restart mode block 20. When the lens is determined to be in focus by this block 22, the control mode is shifted to the inference mode. A block 23 which consists of a step 18 is called the zoom start mode. This is a routine whereby the focus motor 16 is restarted in a case where restart conditions are satisfied at the time of zooming toward a telephoto end position. The flow coming from the restart mode block 20 or the direction-and focus determining mode block 22 is then shifted to the inference mode block 21.

Steps 5 to 7, 10, 11, 15 to 17 and 19 are routines whereby an applicable control mode is set according to the results of the above-stated four control routines.

A step 20 is a routine for actually driving the focus motor 16 in accordance with the speed and the direction determined through the processes described.

With the logic control circuit 11 arranged as described above, the flow of control is executed as follows: At the step 1: The control circuit 11 takes therein the data including the detected value of the high-frequency component of the video signal, that of the blur width of the object image, the difference value of the high-frequency components of the video signal and the difference value of the blur width signals of the object image. At the step 2: The focus control mode is detected. A control routine applicable to the control mode is selected.

In a case where the restart mode is selected, the flow proceeds to the restart mode routine block 20. At the step 3: A check is made to determine if a zooming action is in process. If so, the flow comes to the step 7 without determining the restart. At the step 7: The control mode is set in the zoom start mode to permit zooming. After setting the control mode, the flow comes to the step 20 to cause the focus motor 16 to be driven.

Further, if no zooming action is found at the step 3, the flow proceeds to the step 4. At the step 4: A check is made to find from changes of the input signal data if the state of focus deviates from an in-focus state. In other words, a discrimination is made between necessity and nonnecessity for restart of the focus motor. More specifically, in a case where the restart is decided with a change found in the input information at the step 4, the control mode is set to the direction-and-focus determining mode at the step 5. In the direction-and-focus determining mode block 22, a zoom start mode is set at the step 15 if the camera is found to be in the process of zooming at the step 13. Then, the zoom start program 23 is executed. After that, the flow comes to the step 19 to set and carry out the mode of focusing by the fuzzy inference. If the camera is found not in the process of zooming at the step 13 of the direction-and-focus determining block, the flow comes to the step 14 to determine if the image is in focus. If so, the direction-and-focus determining action of the block 22 is again performed. If the image is found not to be in focus at the step 14, the flow comes to the step 17 to set the mode of detecting focus by the fuzzy inference and the control flow shifts to that mode. After that, the control operation is performed in accordance with the control algorithm of the block 21.

In a case where the focus motor is determined not to be restarted with no change detected at the step 4 of block 20, the flow comes to the step 6 to set the restart mode. Then, the flow of control from the step 3 is executed within the block 20 to make a check for a zooming action or no zooming action and also for any change in input information calling for a restart. With the various modes having been thus set and changed, the flow comes to the step 20 to drive and control the focus motor 16 within the block 24.

If the control mode is found to be the fuzzy inference mode at the step 2, the flow proceeds to the fuzzy inference mode block 21. Then, at the step 8: A driving speed is set for driving the focusing lens 1 to an in-focus point. The focusing lens 1 is driven accordingly. At the step 9: A check is made for an in-focus state. If the image is found to be in focus, the flow proceeds to the step 10 to set the restart mode.

Further, if the image is found to be out of focus at the step 9, the flow proceeds to the step 11 to set the control mode to the fuzzy inference mode. Then the focusing lens driving speed is set on the basis of an in-focus point predicted by the fuzzy inference. The flow then comes to the step 20 to drive and control the focus motor 16 accordingly.

After obtaining data of varied kinds, if the control mode is found to be in the direction-and-focus determining mode 22, the flow comes to the step 12 to determine the focus motor restart direction. This direction-and-focus determining mode is set at the step 5 of the restart mode block 20. After the focus motor restart direction is decided at the step 12, the flow, comes to the step 13 to determine if a zooming action is in process. If the camera is found to be under a zooming operation at the step 13, the flow comes to the step 15 to decide the control mode to be shifted to the zoom start mode of the block 23. Further, if the image is found not to be in focus at the step 14, the flow comes to the step 17 to set the control mode to the mode of detecting focus by the fuzzy inference. The flow comes to the block 21 to execute the steps 8 to 11. The flow then comes to the block 24 to control the focus motor 16.

If the image is found to be in focus at the step 14, the flow comes to the step 16 to retain the direction-and-focus determining mode. The flow then comes to the step 20 to determine the direction by driving the focus motor 16.

In a case where the control mode is found at the step 2 to be set to the zoom start mode of the block 23, the flow comes to the step 18. At the step 18: A zoom start routine is executed by driving a zoom lens. Following the step 18, the flow proceeds to the step 19 to set the control mode to the fuzzy inference mode. The flow then comes to the step 20 to drive the focus motor 16.

After each of the modes is set in the manner as described above and the focus motor 16 is driven, the flow comes back to the step 1 to renew all the input data. Then, the above-stated flow of control is repeated.

After obtaining the data as mentioned above, a control mode is determined and selected at the step 2. The flow then comes to the block 20, 21, 22 or 23 to set the applicable operation mode. After that, each process is executed within the applicable block. Then, the flow comes from the process of each block to the focus motor driving control block 24 to drive the focus motor 16. The flow chart of FIG. 2(a) shows in outline the data inputs at the step 1; the process of setting the control mode at the step 2 after obtaining the data inputs; selection and execution of the operation modes of varied kinds at the steps 3 to 19; and focus motor driving control at the step 20. The flow chart of FIG. 2(b) summarizes only the concrete actions of the control operation. In FIG. 2(b), the steps indicated by the same step numbers as in FIG. 2(a) are identical with those of FIG. 2(a).

Referring to FIG. 2(b), the AF action is controlled after the steps 1 and 2 with the flow of FIG. 2(a) having been started. At the step 8, the focus detecting action is performed on the basis of the fuzzy inference. At the step 9, the focus detecting action is allowed to continue until an in-focus state is determined. When the in-focus state is determined at the step 9, the flow comes to the step 3 to make a check to find if a zooming action (operation) is being performed. If so, the flow comes to a step 23 to carry out the zooming action. After that the flow comes back to the fuzzy inference focus control mode of the step 8. If no zooming operation is found at the step 3, the flow proceeds to the step 4 to decide whether or not the restart is necessary. If the restart is decided to be necessary because of a change in the input information, the flow proceeds to the step 12 to decide the direction in which the focus lens is to be driven. Following this, a check is made again to find if any zooming action (operation) is being performed at the step 13. If so, the flow comes to the step 23 without driving the focusing lens immediately and the zoom action is performed at the step 23. If not, a check is again made to determine if the image is in focus. If so, the flow comes to the step 12 to decide the direction again. If not, the flow comes to the step 8 to adjust focus in the fuzzy inference focus detecting mode by driving the focusing lens in the direction decided.

Next, referring to FIGS. 3, 4, 5(a) to 5(g) and 6, the following describes the control action performed on the focus motor 16 according to the fuzzy inference shown at the step 8 in FIG. 2(a):

FIG. 3 show the flow of control Performed with the fuzzy inference. The step 101 of FIG. 3 is a routine of obtaining data of membership functions to be used for determining a rule at a step 102. At the step 101: The detected value of the high-frequency component of the video signal, that of the blur width of the object image and the difference values of them are obtained in the same manner as in the case of the step 1 of FIG. 2(a).

At steps 102, 103 and 104: The fuzzy inference is made by using these data to finally determine the speed and direction of the focus motor.

Figure 4:
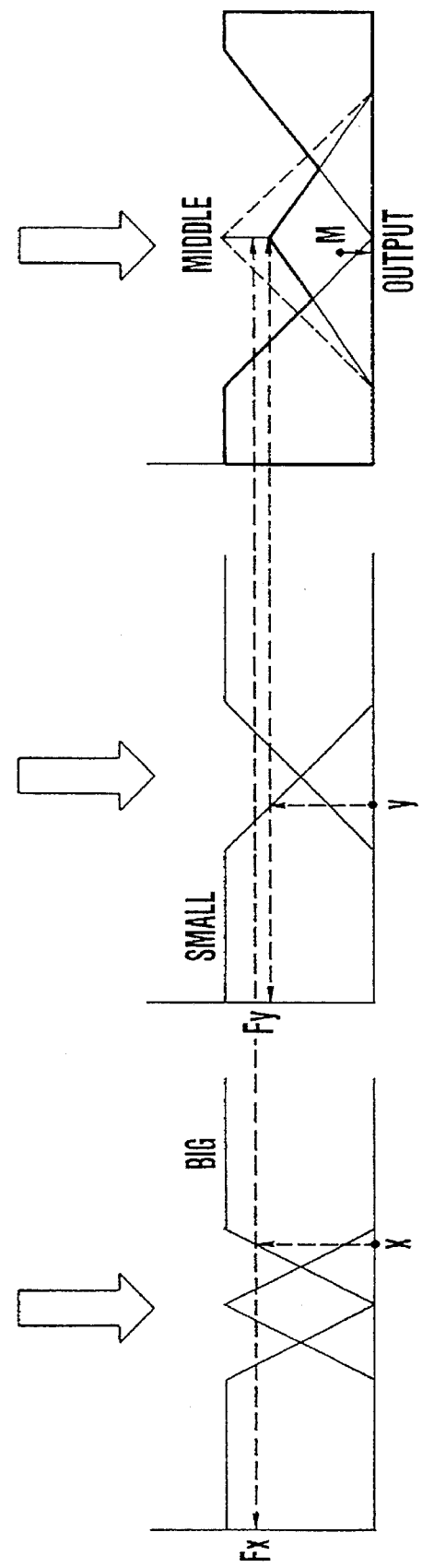
FIG. 4 shows the rules of the fuzzy inference and a basic computing operation on membership functions.

The fuzzy inference is made as shown in FIG. 4. Assuming that a rule is set for some data A and B in general as "if A is big and B is small, then C is middle", the probability Fx of the condition that input data x is "big" is first obtained from a membership function which is defined for the data A. The probability Fy of the condition that input data y is "small" is likewise obtained for the data B. Next, the probability of the condition that a membership function C which is the output of the rule is "middle" is obtained from the probability values Fx and Fy which have already been obtained.

More specifically, the rule has the probability values Fx and Fy as its inputs. Therefore, a line representing the probability that the membership function C is "middle" is compressed as shown in FIG. 4 by applying the smaller of the values Fx and Fy. Then, the barycenter or centroid value M of an area which is defined by the external figure and the coordinate axis of the compressed output membership function C is obtained. The speed and direction of the focus motor 16 are then obtained from the coordinate x of the centroid value M.

Referring again to FIG. 3, the step 103 is a routine for membership computation by which the probability of the condition that each of the input data is, for example, "big" or "small" is obtained from the membership functions set within the logic control circuit. The step 102 is a determining routine for obtaining the logical sum or logical product of the probability values of the membership functions. The step 104 is an output computing step which can be considered to be a routine of determining a focus motor speed and direction by obtaining the probability of the output membership function from the logical sum or logical product of the each of membership functions obtained at the step 102 and by performing a centroid computation on the external figure.

The above-stated method for making determination has been described, for the sake of expediency, to use a single rule consisting of two input membership functions and one output membership function. In actuality, however, the embodiment determines the speed and direction of the focus motor 16 by using six input membership functions and one output membership function as shown in FIGS. 5(a) to 5(g) and 13 rules as shown in FIG. 6.

With a plurality of rules thus provided, the output membership function is obtained in an external figure which is formed by superposing on each other all the external shapes obtained after completion of the determining processes for all the conditions. Then, the focus motor speed and direction are obtained as outputs from the centroid of the superposed external figure.

Figure 5A:
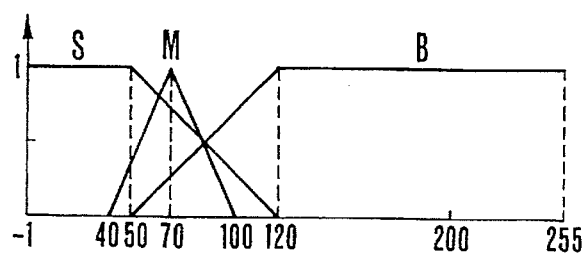
FIGS. 5(a) to 5(g) show computing operations performed according to membership functions used for the fuzzy inference according to the invention.
Figure 5B:
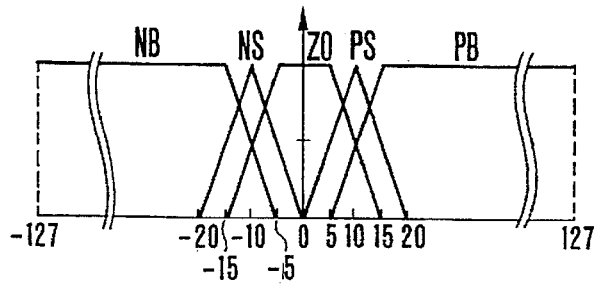

Among FIGS. 5(a) to 5(g), FIG. 5(a) shows the membership function of the detected blur width value ES of the edge part of the object image. It includes three areas S (small), M (middle) and B (big). The probability is determined for each of the three areas. FIG. 5(b) shows the membership function of the difference value, i.e., a changing degree, of the blur width value ES. It includes functions NB and PB which indicate respectively the probability that the difference value is big in the negative direction and in the positive direction; and functions NS and PS which indicate respectively the probability that the difference value is small in the negative direction and in the positive direction. A membership function Z0 indicates the probability of being in the neighborhood of a zero point.

Figure 5C:
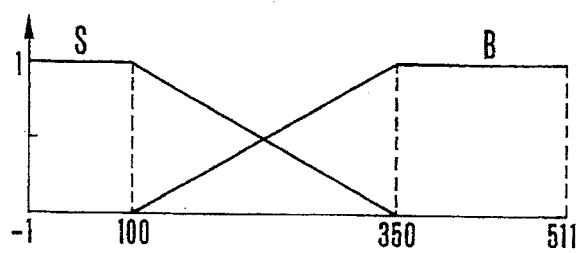
Figure 5D:
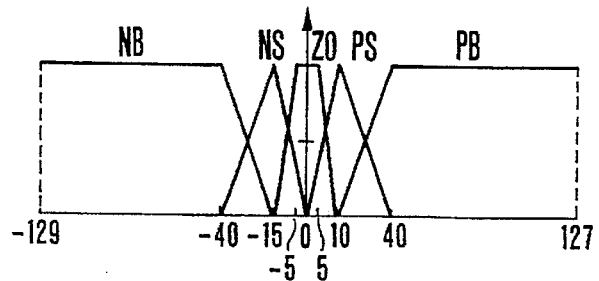

FIG. 5(c) shows the membership function of the detected value FV of the high-frequency component of the video signal. The probability within each area is determined for the two functions S (small) and B (big). FIG. 5(d) shows the membership function for obtaining the difference value of the detected value FV of the high-frequency component, i.e., a changing state of the component. Like in the case of FIG. 5(b), the difference value is evaluated by functions indicating the probability of each of the areas NB, NS, ZO, PS and PB.

Figure 5E:
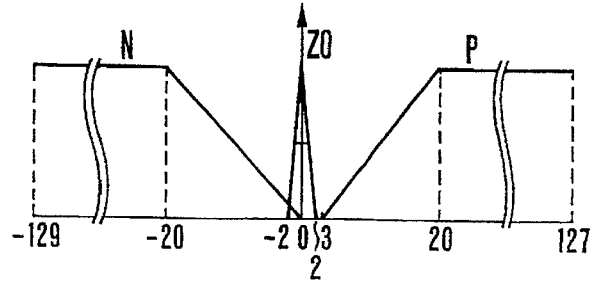
Figure 5F:
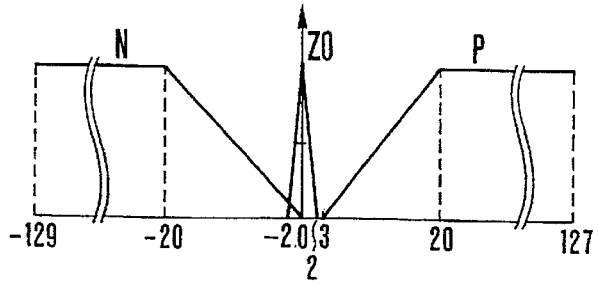

FIG. 5(e) shows the membership function of a value PFMS which corresponds to the length of delay time after an instruction for reverse rotation of the focus motor is issued and before the result of the instruction is obtained. The value is evaluated for each of three areas including a negative range N, a positive range P and an range Z0 which is in the neighborhood of a zero point. FIG. 5(f) shows the membership function of the rotating direction FMDIR of the focus motor. Like in the case of FIG. 5(e), the probability of the rotating direction is evaluated for each of three areas including a negative range N, a range Z0 which is in the neighborhood of a zero point and a positive range P.

Figure 5G:
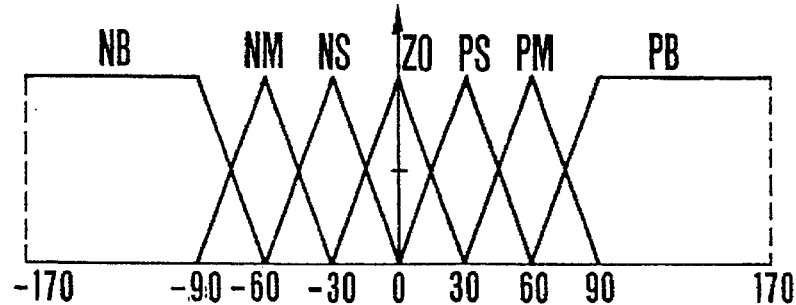

FIG. 5(g) shows the membership function of the speed FMS of the focus motor 16 to be obtained as an output. Three speed ranges (or areas) are set in the negative direction N including an area NB (negative big), an area NM (negative middle) and an area NS (negative small). Three areas of speed are set in the positive direction (P) including an area PB (positive big), an area PM (positive middle) and an area PS (positive small). Another area Z0 is set in the neighborhood of a zero point. The probability of each of these areas is obtained accordingly.

For the six membership functions and one output membership function set as mentioned above, the probability rates of conditions are set for the focus motor speed FMS according to 13 rules shown in FIG. 6. Then, probability data obtained by the membership functions are collated with the output membership function which is shown in FIG. 5(g). A figure is set by the probability values obtained by the above-stated membership functions. A centroid position of the figure is obtained as shown in FIG. 5(g). Then, the focus motor is driven according to the focus motor speed FMS which corresponds to the centroid position thus obtained. In other words, the control circuit obtains the data of varied kinds including the four input data of the detected value and difference value of the high-frequency component of the video signal and those of the blur width of the object image, the data of the current driving direction of the focus motor and that of the delay time in reversely rotating the motor. Then, the evaluation values of the rules which are applicable to these data among the 13 rules of FIG. 6 are obtained respectively on the membership functions shown in FIGS. 5(a) to 5(f). Then, these evaluation values are finally combined on the output membership function of FIG. 5(g). In the computing operation, with the evaluation values obtained for the applicable rules combined on the membership function of FIG. 5(g) in the same manner as in the case of FIG. 4, the AND of an area defined by these evaluation values is obtained to determine a final figure. Then, a value which is obtained on the axis of abscissa corresponding to the centroid position of this figure is selected as the focus motor speed. The focus motor is driven at this speed.

As apparent from the output membership function of FIG. 5(g), the middle point of it represents a zero speed, i.e., an in-focus point. The speeds in the positive and negative directions are defined on the right and left sides of this in-focus point 0. The speed increases accordingly as the speed value point deviates further away from the in-focus point on either side thereof.

Unlike the conventional binary control, the embodiment is arranged to take into consideration all the probability data computed on the membership functions related to the set conditions and to obtain a barycentric output by attaching weight to these data. This arrangement enables the embodiment to perform agreeable focus motor control in a manner most apposite to any of varied conditions. The foregoing describes one example of focus motor control to be performed by making a fuzzy inference. In the case of the described example, the membership functions are fixedly preset.

However, it is known that the dynamic range of the high-frequency signal component used by the embodiment sometimes greatly fluctuates depending on the picture-taking object. Further, the image blur width signal is normalized for the purpose of eliminating any adverse effect of the contrast of the object. In actuality, however, the S/N ratio of the normalized blur width signal tends to be deteriorated by a low contrast state of the object. Under such a condition, the dynamic range of it also fluctuates by the adverse effect of noises. In other words, the dynamic range decreases when the object contrast is low and increases when it is high. Therefore, with the membership functions fixedly preset, the probability determining action might be inapposite to some object, even though it is apposite to other objects.

Figure 7:
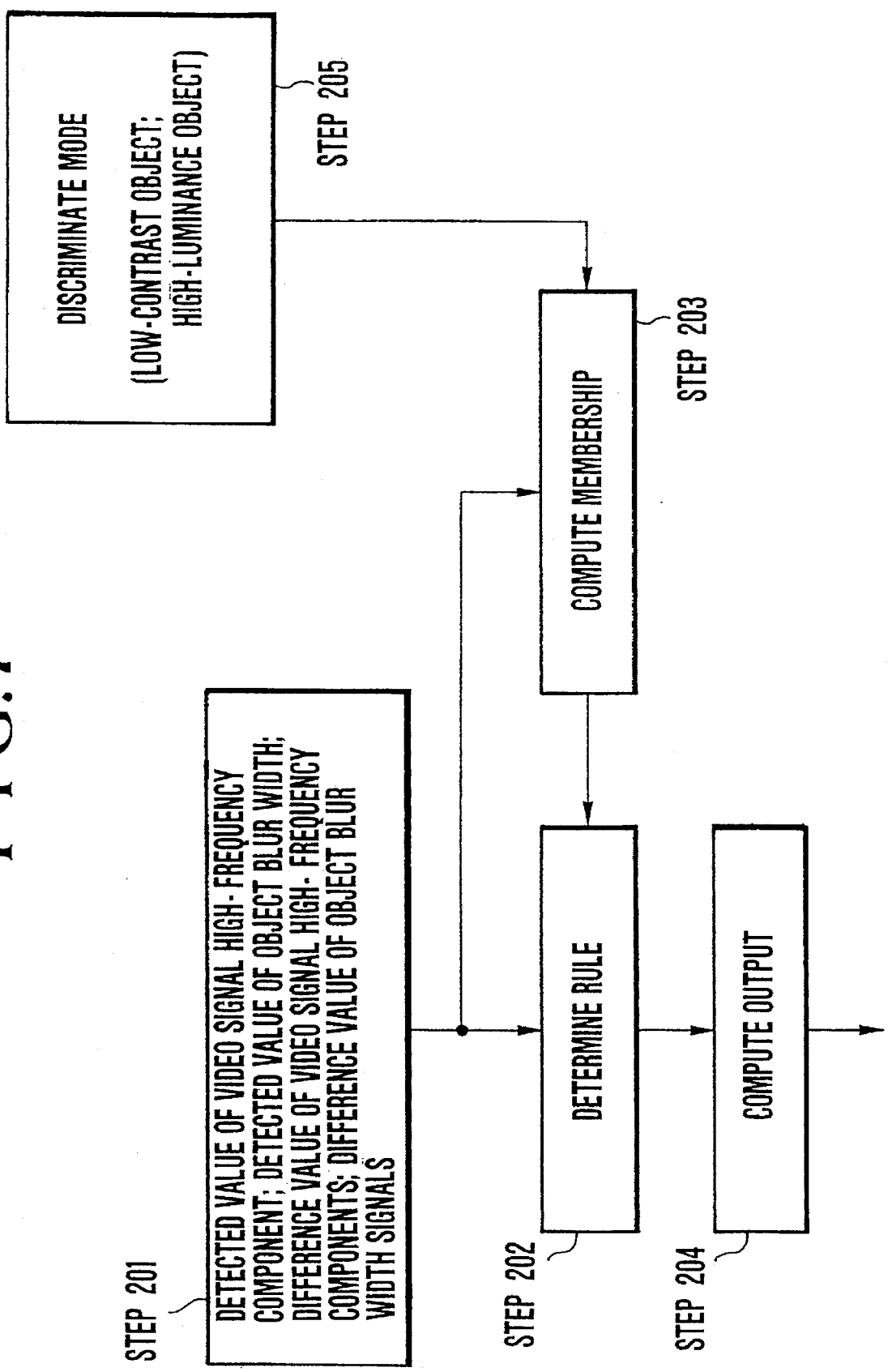
FIG. 7 is a flow chart showing the focus motor speed control performed with the fuzzy inference according to the invention.

To solve this problem, therefore, the embodiment of this invention uses the object discriminating filter 6 as shown in FIG. 1. The degree of contrast of the object is detected by the filter 6. The input membership functions are variably set according to the degree of contrast detected. Therefore, the focus motor is controlled always by using optimum input membership functions. The further details of this are described as follows:

FIG. 7 shows in a flow chart the flow of focus motor control performed with the fuzzy inference. Steps 201 to 204 are arranged to execute routines similar to those of the steps 101 to 104 of FIG. 3. In this case, a step 205 is added to these steps. At the step 205, the output of the object discriminating filter 6 is monitored and determined. The logic control circuit 11 obtains the result of determination through the gate circuit 9 and the peak detecting circuit 10. The output of the filter 6 which corresponds to the contrast of the object is thus detected. If the value of the output is lower than a threshold value, the object is determined to be of low contrast. In this instance, as shown by arrow marks in FIG. 8(a), the areas of the membership functions for the blur width detection value ES and the high-frequency component value FV are shifted toward their "small" sides in such a way as to increase the probability of having each detected value determined to be as large as possible. This enables the system to accurately detect the state of the object, so that the driving speed of the focus motor can be accurately set without having the detection accuracy affected by the low contrast state of the object.

If the output of the object discriminating filter 6 is above the threshold value, the object is determined to be of high contrast. In that instance, as shown by arrows in FIG. 8(b), the areas of the membership functions for the blur width detection value ES and the high-frequency component value FV are shifted toward their "big" sides in such a way as to increase the probability of having each detected value determined to be as small as possible. By this, the state of focus can be prevented from being erroneously determined due to a high luminance state of the object. Further, in a case where the object is determined to be an ordinary object, membership functions are set in middle areas as indicated by broken lines in FIGS. 8(a) and 8(b).

The use of fuzzy inference is advantageous for control involving such ambiguities that can hardly be expressed by the binary notation. However, in cases where the detected data tends to be varied by different conditions, a data computing operation loses its reliability and the intrinsic advantage of fuzzy inference is hardly attainable. Whereas, this invention solves this problem by variably setting the membership functions according to the contrast of the object in accordance with this invention, therefore, the control can be accomplished with the naturalness of the fuzzy inference.

With the input membership functions arranged to be varied according to the degree of contrast of the object in controlling the focus motor with the fuzzy inference as described above, the focus motor can be controlled always in an optimum manner irrespectively of the condition of the object. The advantageous feature of fuzzy inference control be fully attained in focusing.

In the case of the first embodiment described above, the input membership functions are corrected according to the result of detection of the condition of the picture-taking object. However, the invention is not limited to such arrangement. The arrangement may be changed to correct the output membership function instead of correcting the input membership functions. This change is shown in FIGS. 9 and 10.

Figure 9:
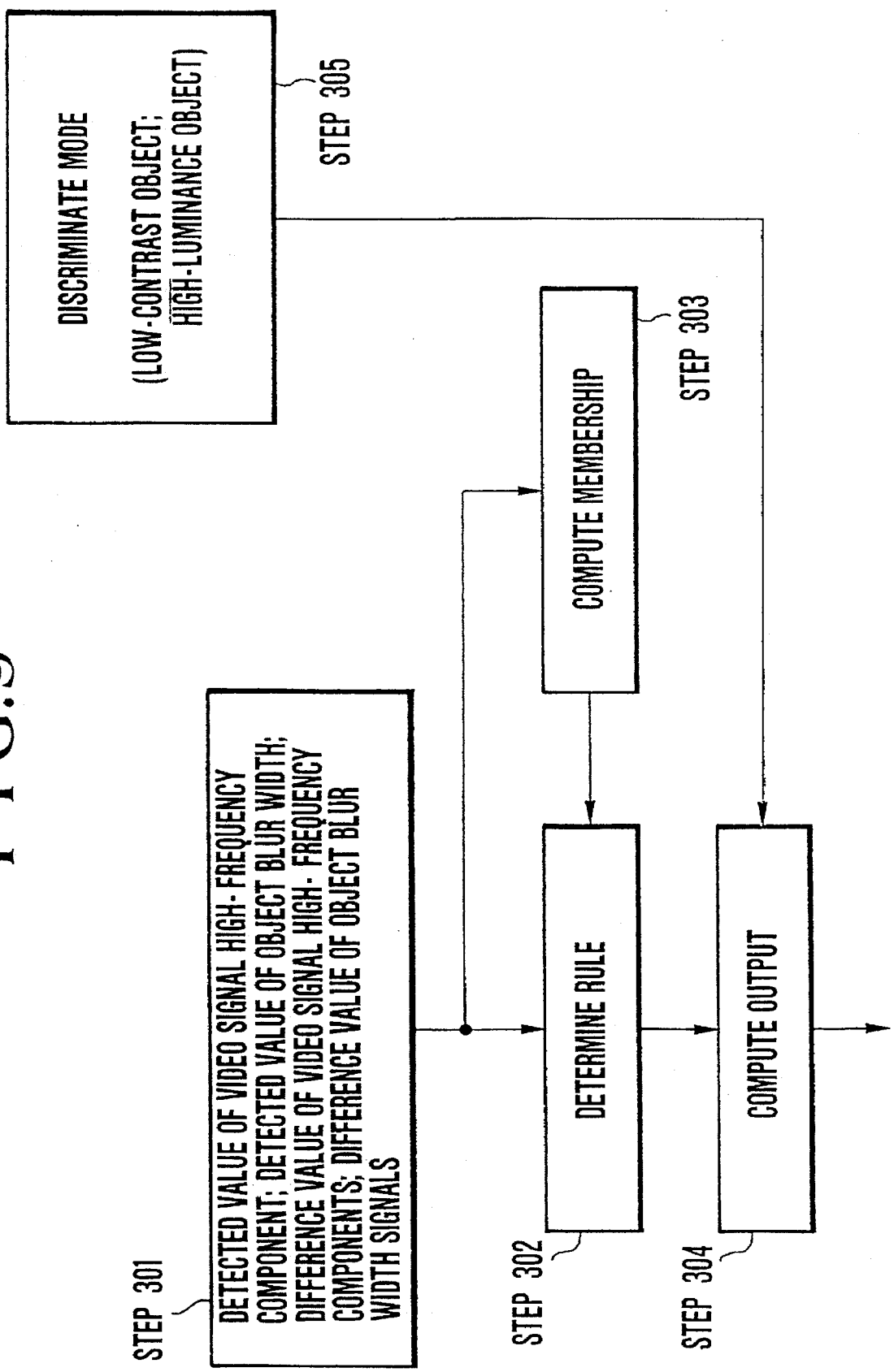
FIG. 9 is a flow chart showing a focus motor speed control operation performed on the basis of a fuzzy inference by another embodiment of this invention.

FIG. 9 is a flow chart showing the control operation of a second embodiment of the invention. FIG. 10 shows by way of example a correcting action performed on the output membership function.

In FIG. 9, steps 301 to 305 show the flow of control similar to the flow shown in FIG. 7. However, a step 305 differs from the flow of FIG. 7. In FIG. 7, a computing step (205) is provided for controlling the computation of membership functions in determining the conditions of the values ES and FV. Whereas, in the case of FIG. 9, the step 305 is provided for controlling an output computation of the focus motor driving speed FMS.

Figure 10A:
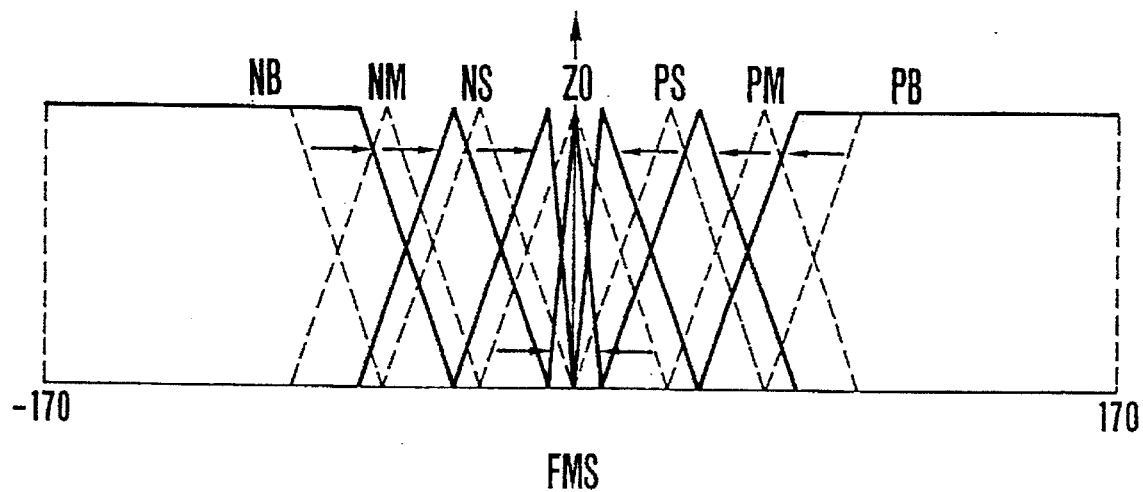
FIGS. 10(a) and 10(b) show an arrangement as a further embodiment for varying membership functions according to the result of mode determination.

In a case where the object is determined to be of low contrast by a mode discriminating action, the output membership function is shifted in such a way as to increase the probability of making the motor speed slower as shown by arrow marks in FIG. 10(a). In other words, the speed control membership function which is to be used as an output is converged toward a zero speed point indicated in the middle of the drawing. This shifts the speed setting value obtained by barycentric computation toward the zero speed of the middle point, i.e., the set value is shifted to a lower speed value.

Figure 10B:
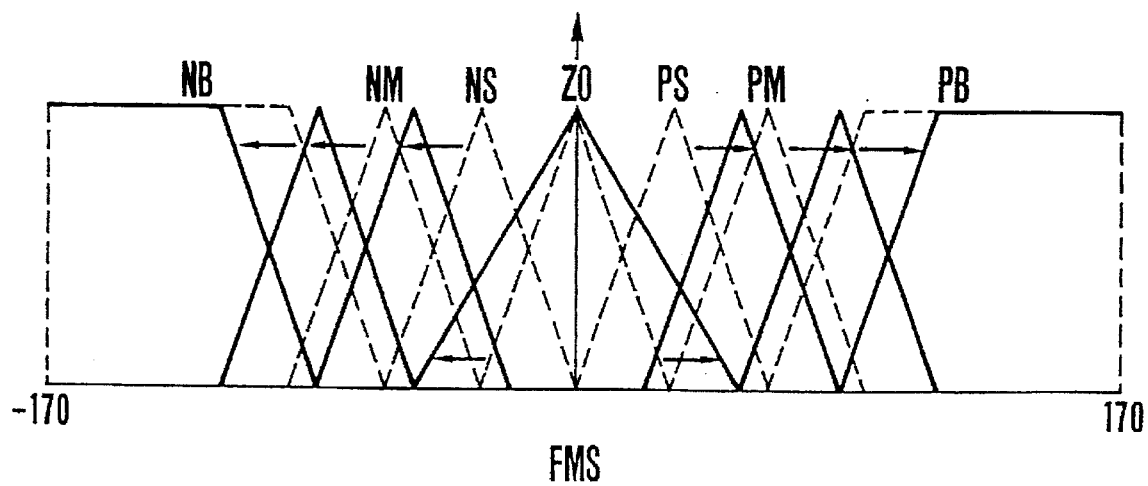

If the object is determined to be of high contrast, the output membership function is shifted in such a way as to increase the probability of making the motor speed higher as shown by arrow marks in FIG. 10(b). In other words, the output membership function indicating the speed is shifted toward higher speed points on both sides. The set value of speed obtained by barycentric computation is thus shifted to a higher speed value.

By this, the focusing action can be accomplished always at an apposite driving speed for a low-contrast object which calls for early deceleration of the focus motor and also for a high-contrast object for which the focus motor must be moved as fast as possible.

Further, it is possible to vary the rules instead of varying the membership functions. More specifically, the conditions for the membership functions of the detected blur width value and the high-frequency component value are changed and lowered for a low-contrast object as follows: The term "big" of the conditions is changed to "middle" and the term "middle" to the term "small". The output membership determining point is also shifted by one step to a slower point. By this, the speed of the focus motor is kept at a lower speed for the purpose of preventing hunting. In the event of a highcontrast object, on the other hand, the conditions for the membership functions of the detected blur width value and the high-frequency component value are changed and raised as follows: the term "small" is changed to "middle" and the term "middle" to "big". The output membership determining point is raised by one step. By this, the speed of the so-called hill-climbing control is increased as much as possible for the purpose of preventing such a faulty action that the focusing lens comes to a stop before an in-focus point is attained.

In the case of the embodiments described, either the detected value of the high-frequency component and that of the blur width or the output membership function of the speed of the focus motor is arranged to be variable according to the contrast of the object image. However, the fineness and accuracy of control can be furthered by variably setting the membership function of any other element that has its characteristic conspicuously change according to changes taking place in ambient conditions.

The automatic focusing system according to this invention is arranged to vary the input membership functions according to the degree of contrast of the object in controlling the focus motor by fuzzy inference. This arrangement enables the system to always appositely control the focus motor. Therefore, the focusing action of the system is comfortably carried out with the advantageous effect of the fuzzy interference control fully attained.

In other words, the invented system uses the fuzzy inference for focus adjustment control which deals with such ambiguities that affect determination of an in-focus state according to changes taking place in the state of the picture-taking object. In addition to this, the system is capable of accurately inferring focus control information by varying the focus determining conditions according to a change occurred in the state of the object even when the change exceeds the range of the determining conditions. Therefore, the control system which makes a fuzzy inference suited for the control dealing with ambiguities is capable of accomplishing the control with such naturalness that is an intrinsic advantage of the fuzzy inference.

What is claimed is:

1. An automatic focusing system comprising:
   a) detecting means for detecting a plurality of information including information which varies with the state of focus;
   b) computing means, using a fuzzy inference, arranged to substitute said plurality of detected information output from said detecting means and information different from said information output from said detecting means for a predetermined input membership function and to compute information relative to a degree to which said plurality of detected information conform with said predetermined input membership function and to substitute said information relative to the degree for a predetermined output membership function according to a predetermined rule to output control information for controlling the state of focus;

c) setting changing means for changing the setting of said input or output membership function on the basis of the state of focus; and d) focus adjusting means for adjusting focus on the basis of said control information output from said computing means.

2. A system according to claim 1, wherein said focus adjusting means includes a focusing lens.

3. A system according to claim 1, of further comprising image sensing means arranged to convert an object image into an image signal, and wherein said detecting means is arranged to extract, from said image signal output from said image sensing means, a high-frequency component and an edge signal corresponding to the width of an edge part of the object image.

4. A system according to claim 1, wherein said computing means is arranged to output as said control information a control information signal for driving and controlling said focus adjusting means.

5. A system according to claim 4, wherein said control information signal is indicative of a driving speed at which said focus adjusting means is to be driven.

6. A system according to claim 4 or 5, wherein said computing means is arranged to obtain, from a plurality of membership functions, degrees to which said plurality of detected information conform with a plurality of preset and predetermined rules through computation and to obtain and produce said control information signal by performing a computing operation using a fuzzy inference algorithm on the basis of the result of said computation.

7. A system according to claim 6, wherein said condition setting varying means is arranged to vary said predetermined conditions according to the state of an object image.

8. A system according to claim 7, wherein said state of an object image is the contrast of the object image.

9. A system according to claim 8, wherein said condition setting varying means is arranged to vary said predetermined conditions in such a way as to cause a focus adjusting speed of said focus adjusting means to be lowered by correcting the result of the computing operation of said computing means when the object image is of low contrast.

10. A system according to claim 9, wherein said condition setting varying means is arranged to vary said predetermined conditions in such a way as to cause a focus adjusting speed of said focus adjusting means to be heightened by correcting the result of the computing operation of said computing means when the object image is of high contrast.

11. A system according to claim 10, wherein said condition setting varying means is arranged to vary said membership functions.

12. A system according to claim 10, wherein said condition setting varying means is arranged to vary said rules.

13. A control device comprising:

a) detecting means for detecting a plurality of information including information which varies with the state of a controlled object;

b) computing means, using a fuzzy inference, arranged to substitute said plurality of detected information output from said detecting means with predetermined input membership function and to compute the probability that said plurality of detected information conform with said predetermined input membership function and to substitute said probability for a predetermined output membership function on the basis of the state of focus to output control information for controlling said controlled object; and c) setting means for changing said predetermined membership functions to correct said control information.

14. A device according to claim 13, further comprising driving means for driving said controlled object on the basis of the control signal output from said computing means.

15. A device according to claim 14, wherein said computing means is arranged to obtain said control signal by performing computation on said probability obtained.

16. A device according to claim 15, wherein said computing means is arranged to obtain, from a plurality of membership functions, degrees to which said plurality of detected information conform with a plurality of preset and predetermined rules through computation and to obtain and produce said control information signal by performing a computing operation using a fuzzy inference algorithm on the basis of the result of said computation.

17. A device according to claim 16, wherein said setting varying means is arranged to correct said membership functions.

18. A device according to claim 16, wherein said setting varying means is arranged to vary the contents of said rules.

19. A device according to claim 17 or 18, wherein said setting varying means includes detecting means for detecting the environment of said controlled object and correcting said predetermined conditions according to said environment.

20. A device according to claim 19, wherein said controlled object is a photo-taking lens of a camera.

21. A video camera comprising:

a) image sensing means for photo-electrically converting an object image to output an image signal;

b) focus detecting means for detecting, from said image signal, a signal which is relative to a high frequency component of the image signal and varies with the state of focus;

c) computing means, using a fuzzy inference, arranged to substitute a plurality of information detected by said focus detecting means and information different from the said information detected by said focus detection means for a plurality of input membership functions to obtain the degrees that said detected information conforms with said input membership functions, and to substitute said degrees for a predetermined output membership function according to a predetermined rule to output focus control information;

d) focus adjusting means for varying the state of focus on the basis of said focus control information output from said computing means;

e) signal detecting means for detecting, from said image signal, a predetermined signal which indicates the state of the object image; and f) correcting means for correcting, on the basis of said predetermined signal output from said signal detecting means, the result of computation of said computing means by correcting at least one of said membership functions.

22. A video camera according to claim 21, wherein said focus detecting means is arranged to detect, from said image signal, the high-frequency component and a signal related to the edge width of the object image.

23. A video camera according to claim 21, wherein said computing means provides, as said focus control information, a control information signal for driving and controlling said focus adjusting means.

24. A video camera according to claim 23, wherein said focus control information relates to a driving speed at which said focus adjusting means is to be driven.

25. A video camera according to claim 23 or 24, wherein said computing means is arranged to compute a control signal with a fuzzy inference by using said plurality of conditions and functions.

26. A video camera according to claim 21, wherein said signal detecting means is arranged to detect the contrast of the object image from a luminance signal included in said image signal.

27. A video camera according to claim 26, wherein said correcting means is arranged to correct said functions in accordance with said contrast.

28. A video camera according to claim 26, wherein said correcting means is arranged to correct said conditions in accordance with said contrast.

29. A camera according to claim 27 or 28, wherein said correcting means is arranged to correct the result of computation of said computing means in such a way as to lower a focus adjusting speed of said focus adjusting means when the object image is of low contrast.

30. A video camera according to claim 29, wherein said correcting means is arranged to correct the result of computation of said computing means in such a way as to heighten the focus adjusting speed of said focus adjusting means when the object image is of high contrast.

31. An automatic focus detecting apparatus, comprising:
   (A) image sensing means;
   (B) extracting means for extracting a plurality of focus signal parameters, which are relative to a high frequency component of an image signal and vary in accordance with a focus state, from the image signal outputted from said image sensing means;
   (C) fuzzy computing means for effecting fuzzy inference operation to detect a focus condition by substituting predetermined membership functions with said plurality of focus signal parameters extracted by said extracting means and another information different from the focus signal parameters on the basis of predetermined rules and for changing said membership functions depending on a photographing state; and
   (D) focus adjusting means for effecting a focus adjustment on the basis of a focus control signal outputted from said computing means.

32. An apparatus according to claim 31, wherein said focus signal parameters include information concerning said high frequency component in said image signal and an edge component.

33. An apparatus according to claim 32, wherein said focus signal parameters further include information concerning timewise changes of changes of said high frequency component and edge component.

34. An apparatus according to claim 32, wherein said focus adjusting means includes a focusing lens, and said fuzzy computing means includes parameters concerning information of a preceding speed a driving direction of said focusing lens.

35. An apparatus according to claim 31, wherein said plurality of membership functions include an input membership function and an output membership function, and said fuzzy computing means is arranged to compute a focus adjusting speed of said focus adjusting means, by using said plurality of membership.

36. An apparatus according to claim 31, wherein said fuzzy computing means consists of a microcomputer.

37. An apparatus according to claim 35, wherein said fuzzy computing means is arranged to detect a contrast of said image signal as the signal parameter indicating said photographing state and to change said membership functions according to said contrast.

38. An apparatus according to claim 37, wherein said fuzzy computing means is arranged to change said membership functions so that an evaluated value of said focus signal parameter is increased when the contrast of said image signal is lower than a predetermined value.

39. An apparatus according to claim 38, wherein said fuzzy computing means is arranged to change said membership functions so that said focus adjusting speed is easily increased to a higher speed when the contrast of said image signal is lower than a predetermined value.

40. A video camera apparatus, comprising:
   (A) a focusing lens;
   (B) image sensing means for converting an optical image incident through said focusing lens into an image signal;
   (C) extracting means for extracting a plurality of parameters, which are relative to a high frequency component of the image signal and vary according to a photographing state, from said image signal;
   (D) fuzzy inference computing means arranged to substitute predetermined membership functions with the plurality of parameters extracted by said extracting means and another information different from the parameters and the information concerning the amount of the timewise variation of said plurality of parameters and the driven direction of said focusing lens, according to predetermined rules, thereby effecting the fuzzy inference computation and outputting a predetermined focus control signal; and
   (E) focus adjusting means for driving the focusing lens on the basis of the focus control signal outputted from said fuzzy computing means.

41. An apparatus according to claim 40, wherein said focus signal parameters include information of said high frequency component in said image signal and edge component.

42. An apparatus according to claim 41, wherein said fuzzy computing means is arranged to output information concerning a driving speed and driving direction of said focusing lens.

43. An apparatus according to claim 40, wherein said membership functions include an input membership function and output membership function, and said fuzzy computing means is arranged to compute the focus adjusting speed of said focus adjusting means by using said membership functions.

44. An apparatus according to claim 43, wherein said fuzzy computing means consists of a microcomputer.

45. An apparatus according to claim 40, further comprising:
   correction computing means arranged to detect a contrast of an object and to correct said fuzzy inference computing means according to said contrast.

46. An apparatus according to claim 45, wherein said correction computing means is arranged to shift said membership functions.

47. An apparatus according to claim 46, wherein said correction computing means is arranged to shift said membership functions so that the driving speed of said focusing lens is increased to a higher speed when the contrast of said image signal is lower than a predetermined value.

* * * * *

UNITED STATES PATENT AND TRADEMARK OFFICE
CERTIFICATE OF CORRECTION

PATENT NO. : 5,666,562
DATED : September 9, 1997
INVENTOR(S) : Kaneda et al.

It is certified that error appears in the above-identified patent and that said Letters Patent is hereby corrected as shown below:

Col. 2, line 4, delete "An" and insert -- an --.

Col. 2, line 60, delete "plurality Of" and insert -- plurality of --.

Col. 3, line 10, delete "interfer-".

Col. 3, line 10, after "fuzzy" insert -- inference --.

Col. 3, line 11, delete "ence".

Col. 5, line 10, delete "According" and insert -- according --.

Col. 7, line 66, delete "Performed" and insert -- performed --.

Col. 12, line 14, delete "highcontrast" and insert -- high-contrast --.

Signed and Sealed this

Twenty-eighth Day of April, 1998

Attest:

BRUCE LEHMAN

Attesting Officer

*Commissioner of Patents and Trademarks*